(12) United States Patent
Egger

(10) Patent No.: US 8,167,316 B2
(45) Date of Patent: May 1, 2012

(54) CLAMPING HEAD PROVIDED WITH FLOATING CLAMPING JAWS

(76) Inventor: Christian Egger, Charancieu (FR)

( * ) Notice: Subject to any disclaimer, the term of this patent is extended or adjusted under 35 U.S.C. 154(b) by 1118 days.

(21) Appl. No.: 11/919,015

(22) PCT Filed: Apr. 13, 2006

(86) PCT No.: PCT/EP2006/003403
§ 371 (c)(1),
(2), (4) Date: Dec. 21, 2007

(87) PCT Pub. No.: WO2006/111320
PCT Pub. Date: Oct. 26, 2006

(65) Prior Publication Data
US 2009/0051092 A1 Feb. 26, 2009

(30) Foreign Application Priority Data
Apr. 21, 2005 (DE) .......... 10 2005 018 655

(51) Int. Cl.
*B23B 31/16* (2006.01)
(52) U.S. Cl. ........ 279/124; 279/123; 279/133; 279/132; 279/2.01; 279/2.21; 279/110
(58) Field of Classification Search .............. 279/123, 279/124, 132, 133, 110, 2.01, 2.21, 2.06
See application file for complete search history.

(56) References Cited

U.S. PATENT DOCUMENTS

| | | | |
|---|---|---|---|
| 4,353,561 A | 10/1982 | Peterson | |
| 5,842,703 A * | 12/1998 | Antoni | 279/123 |
| 5,890,720 A * | 4/1999 | Antoni | 279/123 |
| 6,568,694 B1 * | 5/2003 | White | 279/133 |
| 6,910,693 B2 * | 6/2005 | Onyszkiewicz et al. | 279/106 |

FOREIGN PATENT DOCUMENTS

| | | |
|---|---|---|
| DE | 36 20 260 A1 | 1/1987 |
| DE | 36 22 725 A1 | 1/1988 |
| DE | 195 33 456 B4 | 3/1997 |
| DE | 199 34 375 A1 | 2/2001 |
| DE | 296 24 215 U1 | 4/2001 |
| DE | 203 20 649 U1 | 2/2005 |
| JP | 07246559 A | 9/1995 |
| SU | 795 727 A | 1/1981 |
| SU | 795727 * | 1/1981 |
| SU | 1 115 855 A | 9/1984 |
| SU | 1115855 * | 9/1984 |

* cited by examiner

*Primary Examiner* — Eric A Gates
*Assistant Examiner* — Bayan Salone
(74) *Attorney, Agent, or Firm* — Pauley Petersen & Erickson

(57) ABSTRACT

A clamping device for fixing a machined part to a processing axis in a machine tool including the processing axis, a clamping head which is rotatable thereabout and with clamping elements floatably arranged thereon.

26 Claims, 6 Drawing Sheets

CLAMPING HEAD PROVIDED WITH FLOATING CLAMPING JAWS

BACKGROUND OF THE INVENTION

1. Field of the Invention

This invention relates to a clamping arrangement for clamping a workpiece to be processed along a processing shaft in a processing machine.

2. Discussion of Related Art

Processing machines, for example, circular grinding machines, milling machines or lathes, are comprised of one or several processing shafts, along which a workpiece clamped in the processing machine can be worked. In this case, the workpiece is clamped in the processing machine by a clamping arrangement. Depending on the processing machine and the work process, the workpiece is either clamped along the processing shaft or radially with respect to the processing shaft.

For example, for clamping along the processing shaft it is known to clamp the workpiece between two cone-shaped or truncated cone-shaped clamping tips, which can be displaced relatively to each other along the processing shaft. The clamping tips can be adjusted in relation to each other using power. In connection with a tube-shaped workpiece, the clamping tips enter the ends of the workpiece, partial under spring pressure. For adapting the clamping tips to different workpieces the clamping tip can be in the form of a clamping head with clamping elements, which are exchangeably arranged on it. In this case, the parallelism is oriented by the axis-parallel displacement of the clamping tips in relation to the processing shaft. Here, the clamping arrangement includes the two clamping tips, as well as the displacement mechanism for pressing the two clamping tips against each other.

A clamping tip, which can be arranged on a tailstock and is supported on a tailstock sleeve, is known from German Patent Reference DE 195 33 456 B4. The clamping tip is in one piece and has a shape of a circular cone.

A co-rotating clamping tip or tailstock sleeve, seated in a housing, and which is also embodied in one piece and has a shape of a circular cone, is known from German Patent Reference DE 36 22 725 A1.

Because of the rigid clamping of the clamping tips in one piece and shaped as circular cones, there is the danger of deforming tube-shaped workpieces, for example, which have centering or clamping faces which are inexactly produced or deformed by hardening distortion while clamping them between the clamping tips. Also, dirt accumulation at the clamping tips or the workpiece, for example, can result in considerable deformation in connection with the described clamping situation.

For radial clamping in relation to the processing shaft, a clamping chuck is customarily employed, which can be rotated around the processing shaft, can be driven and has clamping jaws, which are radially movable, can be adjusted, for example by an adjustable wrench, and can be clamped against the workpiece. In this case, the clamping jaws are such that the workpiece can be clamped between the clamping jaws from the direction of its exterior circumference or, in case of a tube-shaped workpiece, from its interior circumference. In this case the clamping arrangement comprises the clamping chuck, which has a chuck body, radially adjustable clamping jaws, and an adjusting mechanism for the simultaneous radial displacement of the clamping jaws.

Compared with the previously described clamping tips, it is possible to call the clamping chuck body a clamping head and the clamping jaws clamping elements, so that a clamping arrangement, regardless of the clamping situation, comprises a clamping head, clamping elements adjustably arranged on the clamping head, as well as an adjusting mechanism. A clamping head for use in a processing machine customarily has three clamping elements, which center the workpiece between three contact points formed between the clamping elements and the workpiece while clamping.

A clamping arrangement is known from German Patent Reference DE 296 24 215 U1, which has a clamping chuck body with at least two radial jaw guidance elements for a clamping jaw, including a base jaw and a crown jaw which are radially adjustable in the jaw guidance element.

A clamping arrangement is known from German Patent Reference DE 203 20 649 U1, having a clamping chuck body and several clamping jaws, which are movably arranged in radial jaw guidance elements and can be adjusted together radially with respect to the clamping chuck axis by an adjusting mechanism.

Because of the adjusting mechanism causing a rigid displacement of the clamping jaws, a deformation of the workpiece occurs in such clamping arrangements during the clamping process which, following the unclamping of the workpiece after its processing, has a negative effect on the accuracy of its shape and measurements, because in every case the workpiece again assumes its original shape.

A clamping arrangement is known from German Patent Reference DE 199 34 375 A1, which comprises a clamping chuck with two clamping jaws, which can be radially adjusted and clamped against the workpiece. Each of the clamping jaws is arranged pivotable to a limited extent around pivot shafts extending parallel with the processing shaft. Here, the pivotable clamping jaws can be adapted to a limited degree to the circumference of a workpiece by being pivoted around the pivot shafts extending parallel to the processing shaft. However, no adaptation to workpieces of variable shapes in the axial direction along the processing shaft is possible here, so that with this type of clamping a point-like resting of the clamping jaws against the workpiece occurs. Because of this, strong deformations occur in the areas in which the clamping jaws rest point-like against the workpiece, together with a corresponding bad result of the workpiece shape and measurements following unclamping.

A clamping arrangement is known from German Patent Reference DE 36 20 260 A1, which comprises a clamping chuck with radial clamping jaws, which can be clamped against the workpiece. Here, the workpiece is clamped between two clamping tips. The clamping chuck is arranged concentrically in relation to a clamping tip. For being able to compensate eccentricities in the workpiece clamped between the tips, the clamping chuck is arranged freely displaceable with respect to the clamping tip both in the radial and the axial direction. Deformations already occurring when clamping the workpiece between the clamping tips cannot thus be compensated.

Thus, it is disadvantageous in connection with the prior art that, for example with very precise workpieces which are exactly shaped in prior processing stages, in particular with tube-shaped and/or thin-walled workpieces, these are deformed when being clamped, because the clamping elements forcibly impress their shape on the workpiece during clamping, or that the workpiece is deformed corresponding to the positions of the clamping elements, and thus the position of the spot-shaped or line-shaped contact faces between the clamping head and the workpiece. One problem arises in connection with inexactly preshaped workpieces that are substantially centered in accordance with the shape of their exterior or interior circumference in the area of or near the spot-shaped contact faces between the clamping head and the workpiece, and not in accordance with a preferred processing shaft which, for example, is oriented relative to the workpiece to be produced.

SUMMARY OF THE INVENTION

One object of this invention is to provide a clamping arrangement, by which a deformation, in particular of inexactly preshaped workpieces, is avoided during clamping, as well as a deformation of precisely preshaped workpieces which are clamped, for example, in the presence of dirt accumulation.

The above object is attained in a clamping arrangement of the species mentioned at the outset by characteristics taught in this specification and in the claims.

At least in the not yet clamped state of the clamping arrangement, the term floating arrangement includes an additional degree of freedom of movement of the clamping element in addition to the movement taking place for clamping the workpiece together with the clamping tip or relative to the clamping head or clamping chuck. Such a degree of freedom can include, for example, a possibility for shifting the individual clamping elements vertically with respect to their respective movement for clamping the workpiece, a pivotable arrangement of the clamping elements around a common, or respectively their own pivot axis, or a combination of these.

The clamping arrangement in accordance with this invention can be arranged as a clamping chuck with clamping jaws floatingly arranged on the clamping chuck, as well as a clamping tip with clamping elements arranged floatingly, for example on the shell surface of the clamping tip.

In connection with a clamping arrangement, embodied as a clamping tip comprising a clamping head, as well as clamping elements exchangeably arranged thereon, this means in a definite manner that, as described above, the clamping elements are floatingly seated on the clamping head, for example that the clamping elements are each pivotable in a translatory manner, preferably within defined limits, relative to the clamping head in at least one direction transversely to the displacement direction required for clamping of the clamping tip, and/or can be pivoted around at least one axis.

In connection with a clamping arrangement designed as a clamping chuck body, as well as clamping jaws which can be radially displaced on it, in a definite manner the clamping jaws are each pivotable in a translatory manner, preferably within defined limits, relative to the clamping head in at least one direction transversely to the displacement direction required for clamping, and/or can be pivoted around at least one axis which intersects the processing shaft or extends skewed in relation to it.

In comparison with the prior art, the clamping arrangement in accordance with this invention has one advantage that with the floating arrangement of the clamping elements on the clamping head the clamping elements can adapt themselves to the existing shape of a workpiece to be clamped in the processing machine, so that the workpiece retains its exactly produced geometry when it is unclamped. This is of advantage in particular with tube-shaped and/or thin-walled workpieces, because these can be easily deformed when being clamped by the clamping elements. In this connection it is for example conceivable that, in particular for clamping workpieces of a shape which can change in the axial direction, the clamping jaws are respectively pivotable either around an axis intersecting the processing shaft, one that is skewed with respect to it, or around several axes.

In one embodiment of this invention, the clamping elements can perform pivot movements in the unclamped state and until shortly before the final clamping position. Here the floating arrangement of the clamping elements on the clamping head includes at least one pivotable arrangement of the clamping elements at the clamping head. The floating arrangement can also include a displaceability of the individual clamping elements vertically to their respective movement required for clamping the workpiece.

In one embodiment of this invention, the clamping elements are each arranged to be pivotable around respectively one pivot shaft extending parallel with the processing shaft, so that each clamping element can perform a pivot movement around its own pivot shaft extending parallel with the processing shaft.

Another embodiment of this invention provides that the clamping elements are arranged evenly distributed over the circumference of the work piece to be clamped in the processing machine. The greatest possible even clamping of the workpiece, along with the least possible deformation of the workpiece because of the clamping situation, is achieved by a uniform distribution of the clamping elements over the circumference.

In another embodiment of this invention, the clamping elements each have two clamping faces, which are arranged, preferably spaced apart from each other, in the circumferential direction of the workpiece to be clamped, can be brought into contact with the workpiece clamped in the processing machine, and when the workpiece is clamped in the processing machine come to rest against the existing shape of the workpiece because of the floating arrangement of the clamping elements at the clamping head. In this case the term clamping faces also includes those surfaces having an infinitesimal extension in one direction, for example contact lines.

In another embodiment of this invention, the clamping faces of all clamping elements of the clamping arrangement are arranged evenly distributed over the circumference of the workpiece to be clamped in the processing machine. With the clamping faces, which are evenly distributed over the circumference and that come to rest evenly against the workpiece because of the floating arrangement of the clamping elements at the clamping head, the danger of a deformation of the workpiece when being clamped into the clamping arrangement is reduced.

In one embodiment of this invention, three clamping elements are evenly distributed over the circumference of the workpiece to be clamped in the processing machine and together have six clamping faces evenly distributed over the circumference of the workpiece.

In another embodiment of this invention, the clamping head comprises a clamping tip, which can be inserted, at least in part, into the front of a tube-shaped workpiece and is substantially cone-shaped or truncated cone-shaped, with an axis of symmetry that coincides with the processing shaft, wherein the clamping elements are floatingly arranged on the shell surface of the clamping tip.

In one embodiment of this invention, the clamping head comprises a clamping tip, which can be inserted, at least in part, into the front of a tube-shaped workpiece and is substantially cone-shaped or truncated cone-shaped, with an axis of symmetry that coincides with the processing shaft, wherein the clamping elements are floatingly arranged in recesses arranged on the shell surface of the clamping tip.

In another embodiment of this invention, the clamping head comprises a clamping tip which can be inserted, at least in part, into the front of a tube-shaped workpiece and is substantially cone-shaped or truncated cone-shaped, with an axis of symmetry coincides with the processing shaft, wherein the clamping elements form at least a portion of the shell surface of the cone-shaped or truncated cone-shaped clamping tip.

In one embodiment of this invention, for clamping the workpiece between the clamping elements, the clamping elements are arranged at the clamping head so that they are displaceable in the radial direction from the direction of the exterior circumference of the workpiece or, in connection with a tube-shaped workpiece, alternatively around the clamping elements from the direction of the interior circumference of the workpiece.

In one embodiment of this invention, the clamping head comprises a substantially cylinder-shaped clamping chuck, with an axis of symmetry that coincides with the processing shaft, wherein the clamping elements include clamping jaws arranged on the clamping chuck body, which are displaceable substantially radially with respect to the processing axis. In this case, the pivot shafts around which the clamping jaws are pivotably arranged are also displaced radially with respect to the processing axis, together with the radially displaceable clamping jaws.

In another embodiment of this invention, the clamping head, which is arranged to be rotatable around the processing axis, can be driven. For example, this is required in case of the employment of the clamping arrangement, in accordance with this invention, in lathes or circular grinding machines.

In another embodiment of this invention, a processing machine includes a processing shaft, which has two clamping tips arranged on the processing shaft opposite each other, as previously described, between which a tube-shaped workpiece, for example, is clamped. In this case, preferably one of the two clamping tips can be driven, wherein the second clamping tip is driven by the first one via the workpiece.

In another embodiment of this invention, a processing machine has a clamping head which can be driven around the processing shaft, for clamping a workpiece between clamping jaws, which are arranged at the clamping chuck body of the clamping head substantially radially displaceable in relation to the processing shaft.

BRIEF DESCRIPTION OF THE DRAWINGS

This invention is explained in greater detail in view of exemplary embodiments, wherein:

FIG. 3a is a front view of a clamping tip in accordance with this invention, with clamping elements arranged thereon;

FIG. 3b is a lateral view of the clamping tip in FIG. 3a;

FIG. 3c is a section taken along the line A-A through the clamping tip in FIG. 3b;

FIG. 4a is a front view of a clamping element pivotably arranged at a clamping element represented in FIG. 3;

FIG. 4b is a lateral view of the clamping element shown in FIG. 4a;

FIG. 4c is a top view of the clamping element shown in FIG. 4a;

FIG. 4d is a perspective plan view of the clamping element shown in FIG. 4a;

FIG. 5b is a perspective plan view of the clamping element shown in FIG. 5a;

FIG. 6b is a perspective plan view of the clamping arrangement in FIG. 6a.

DETAILED DESCRIPTION OF THE INVENTION

Figure 1:
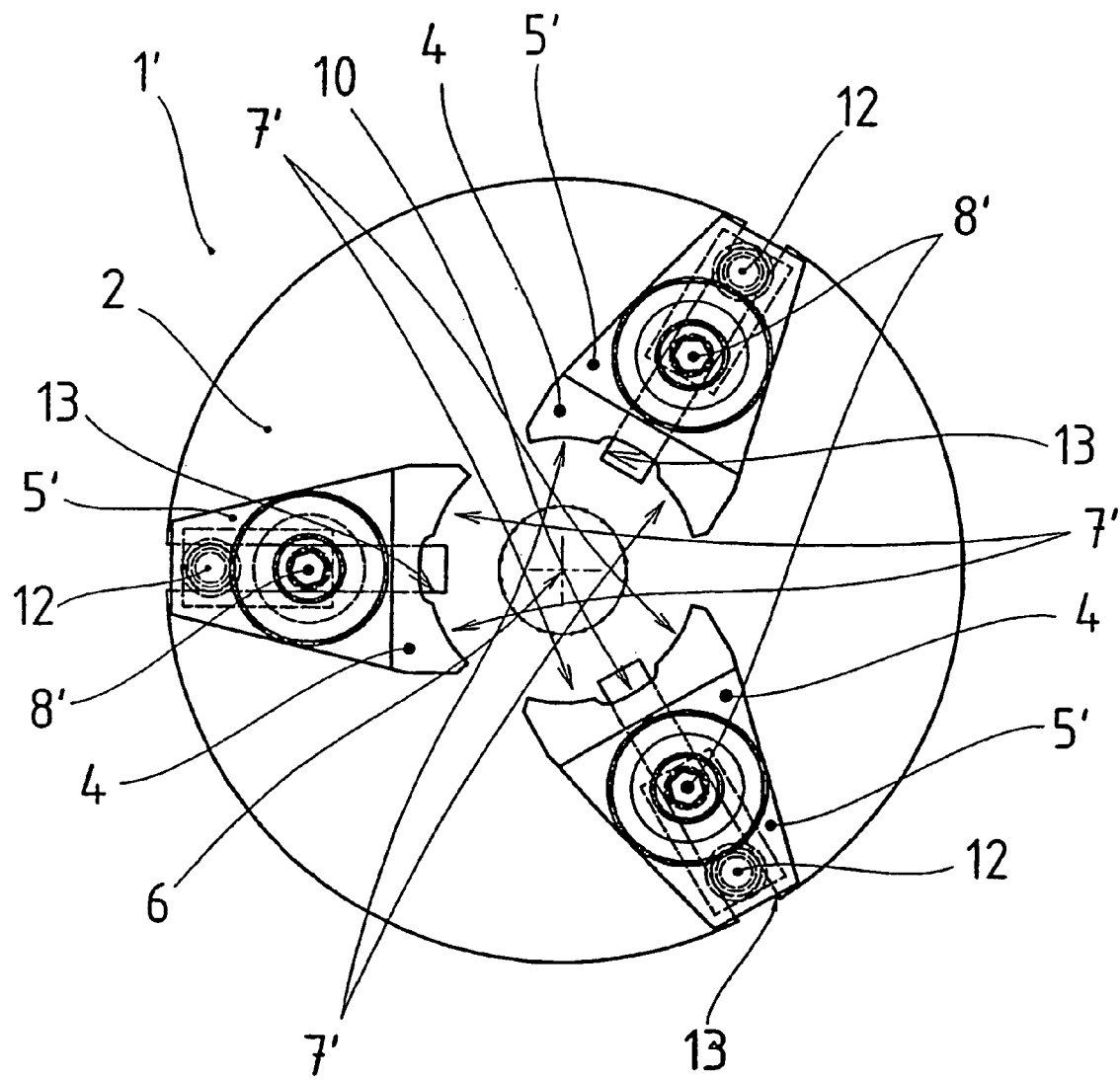
FIG. 1 is a top view of a clamping arrangement having a clamping chuck body, as well as clamping jaws arranged radially displaceable thereon.
Figure 2:
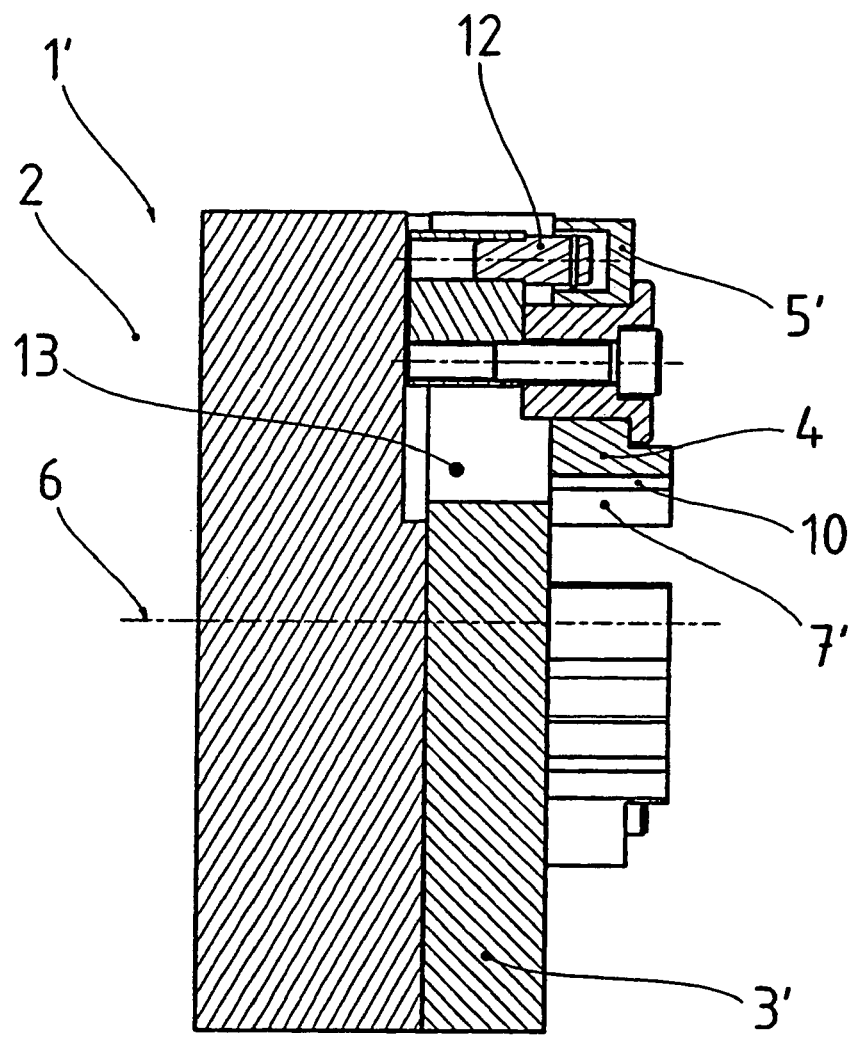
FIG. 2 is a lateral view, partially shown in section, of the clamping arrangement.

A clamping arrangement 1' shown in FIGS. 1 and 2 comprises a clamping head 3' including a cylinder-shaped clamping chuck body 2 with clamping elements 5', embodied as clamping jaws 4, arranged on it. The clamping jaws 4 are arranged, radially displaceable with respect to a processing shaft 6, on the clamping chuck body 2. The clamping jaws 4 are arranged in radially extending grooves 13 for this purpose. The axis of symmetry of the cylinder-shaped clamping chuck body 2 coincides with the processing shaft 6. All clamping jaws 4 can be simultaneously displaced radially relative to the processing shaft 6 by a displacement mechanism, not represented, arranged in the clamping chuck body 2. A workpiece can be clamped radially relative to the processing shaft 6 by the radially displaceable clamping jaws 4, for example because the clamping jaws 4, approaching from the direction of the outside of the workpiece, are placed against its exterior or, for example in connection with a tube-shaped or a ring-shaped workpiece, extend into it and are placed, approaching from the direction of the inside, against the interior circumference of it. Each clamping jaw 4 has two clamping faces 7'. Also, each clamping jaw 4 is floatingly arranged on the clamping chuck body 2, so that both clamping faces 7' can be placed against the workpiece in the course of clamping the workpiece. Deformations during clamping of the workpieces are thus prevented, which has a positive effect on the accuracy of the shape and measurements after the subsequent processing and unclamping of the workpieces. The floating arrangement is achieved in the exemplary embodiment of FIGS. 1 and 2 because each of the clamping jaws 4 is seated, pivotable around a first pivot shaft 8' extending parallel in relation to the processing shaft 6, as well as around a second pivot shaft 14, which extends perpendicularly with respect to the first pivot shaft 8' and vertically with respect to the plane including the processing shaft 6 and the respective first pivot shaft 8'. Bolts 12 limit the pivot movements of the clamping jaws 4 around the pivot shaft 8'. It is also possible to arrange the clamping jaws 4 radially translatorily displaceably vertically with respect to the processing shaft 6, as well as respectively vertically with respect to their respective displacement direction in relation to the processing shaft 6. During a displacement of the clamping jaws 4 radially relative to the processing shaft 6, the pivot shafts 8', 14, together with the clamping jaws 4, are radially displaced relative to the processing shaft 6.

Figure 3:
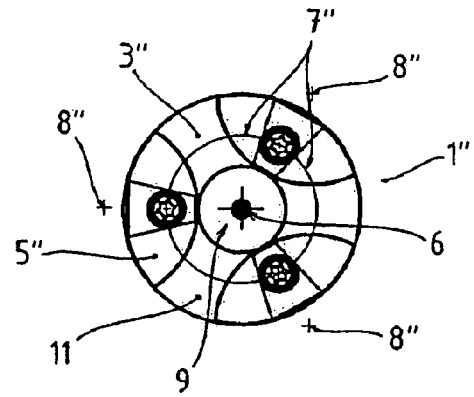
Figure 3:
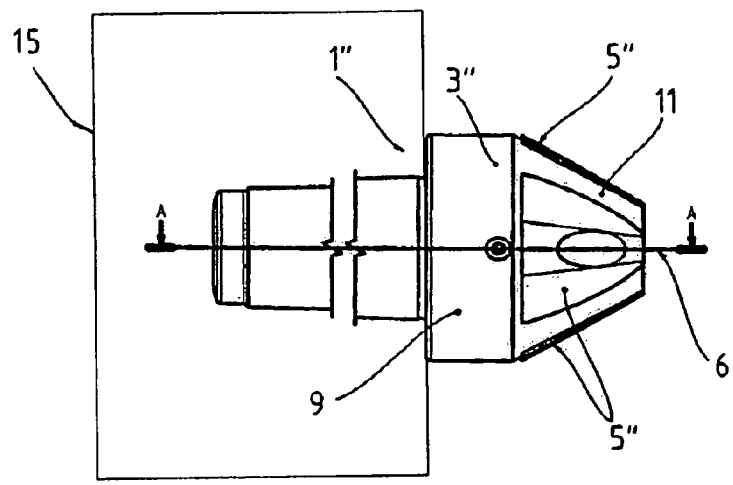
Figure 3:
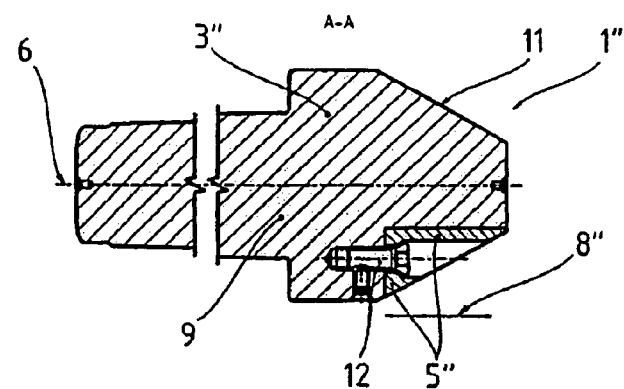
Figure 4:
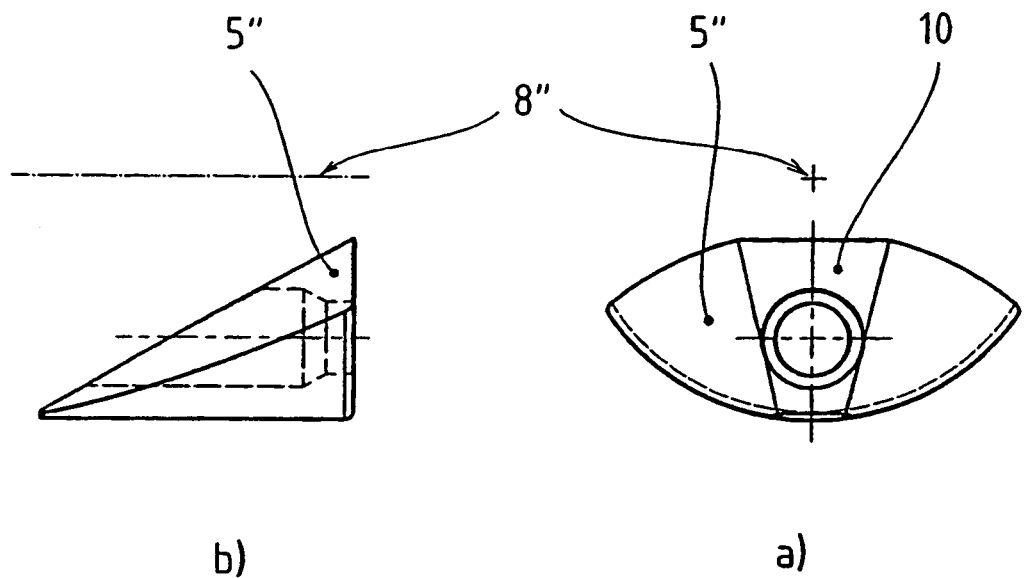
Figure 4:
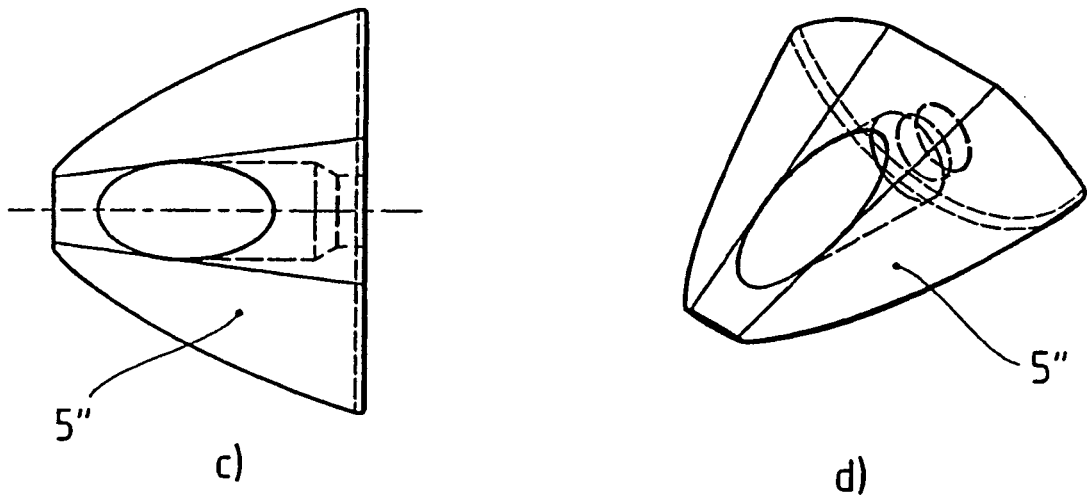
Figure 5A:
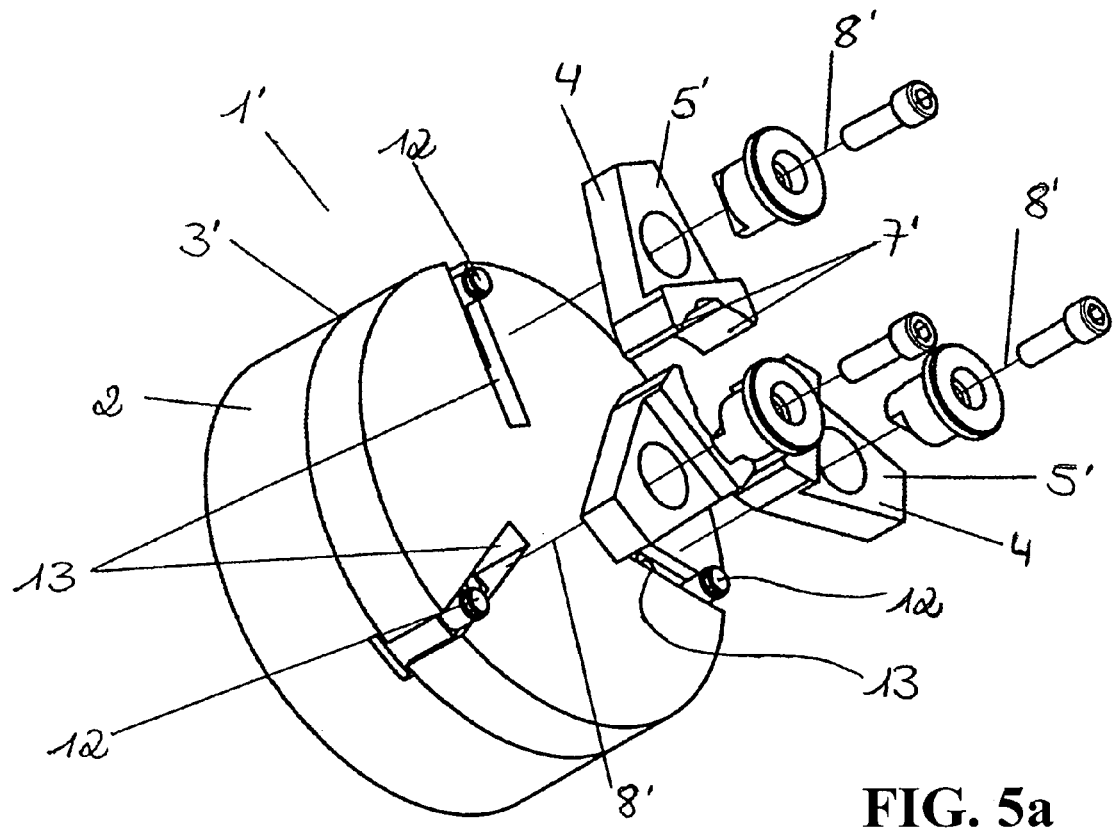
FIG. 5a is a perspective plan view of the clamping arrangement in FIGS. 1 and 2, having a clamping chuck body, as well as clamping jaws arranged radially displaceable thereon, in an exploded view.
Figure 5B:
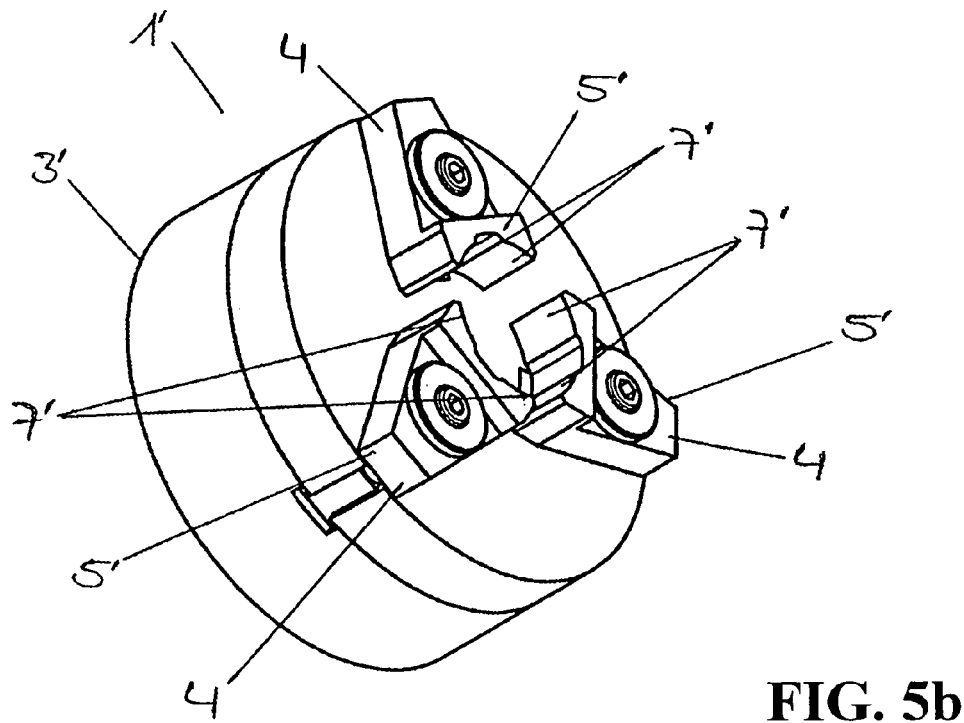
Figure 6A:
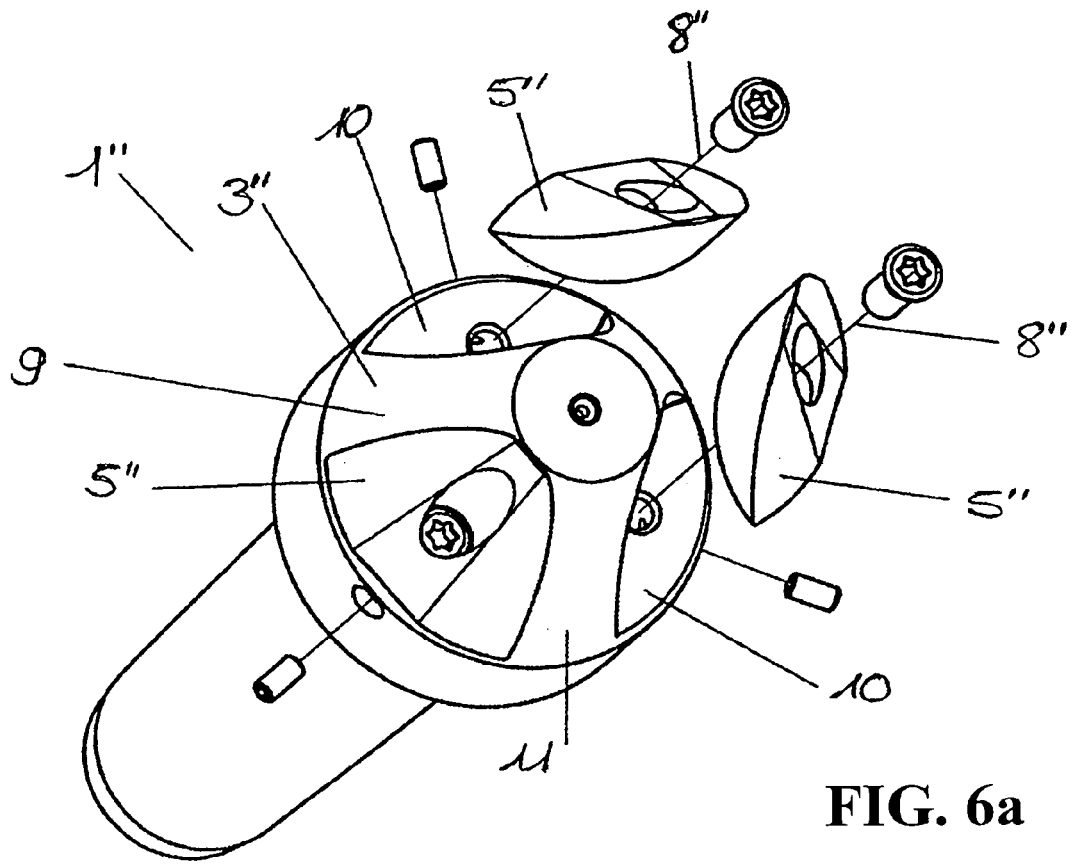
FIG. 6a is a perspective plan view of the clamping tip in accordance with this invention with clamping elements from FIGS. 3 and 4 arranged thereon, in an exploded view.
Figure 6B:
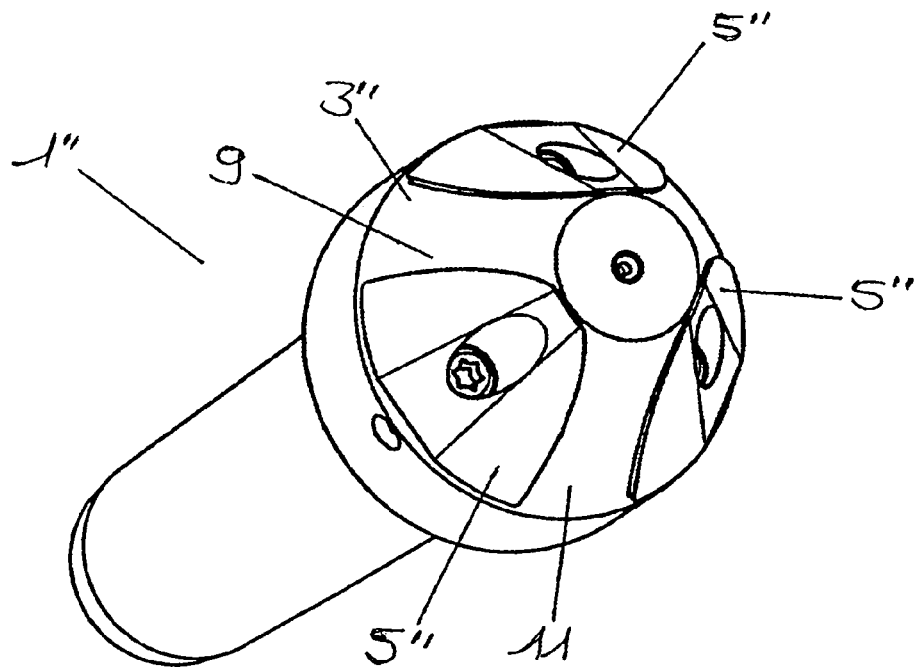

A clamping arrangement 1" in accordance with this invention, represented in FIGS. 3 and 4, comprises a clamping head 3", embodied as a truncated cone-shaped clamping tip 9, and clamping elements 5" arranged thereon, each pivotable around their own pivot shafts 8" extending parallel relative to the processing shaft 6, The clamping elements 5" are floatingly arranged in cutouts 10 formed on the shell surface 11 of the clamping tip 9. The floating arrangement is achieved in the exemplary embodiment according to FIGS. 3 and 4 because the clamping elements 5" are pivotable around pivot shafts 8" extending parallel with the processing shaft 6. It is also possible for the pivot shafts 8" to not extend parallel with respect to the processing shaft 6, but instead intersect it in a common location. In the normal case, the axis of symmetry of the truncated cone-shaped clamping tip 9 coincides with the processing shaft 6, but can also extend offset parallel relative to the processing shaft 6. For clamping a tube-like workpiece, schematically represented by a dash-dotted circle in FIG. 3a, two clamping tips 9 are provided, which are located opposite each other on the processing shaft 6 and can be moved toward each other under power by a displacement mechanism, represented by box 15. The clamping tips 9 here extend frontally into the tube-like workpiece in the direction of the processing shaft 6. The clamping elements 5" are designed convex or concave in the direction toward the clamping tip 9, as well as away from the clamping tip 9. Thus, the clamping elements 5" each have two clamping faces 7" which, because of the floating arrangement of the clamping elements 5" at the clamping head 3", are placed against the workpiece while clamping a workpiece between two clamping tips 9. Deformations in the course of clamping tube-like workpieces are thus prevented.

The pivot movements of the clamping elements 5', 5" can be limited by suitable means, for example for preventing the pivoting-away far from the processing shaft 6 in the unclamped state, which would hamper the clamping of a workpiece. For example, such means are the bolts 12, represented in FIGS. 1 and 2, which limit the pivot movement, or the screws 12, represented in FIGS. 3 and 4, which limit the pivot movement, or the play between the cutouts 10 and the clamping elements 5" arranged in them, which can be affected by shaping the cutouts 10 and the clamping elements 5" arranged in them.

This invention can be commercially applied, in particular in the field of manufacturing and operating processing machinery, such as machine tools, as well as in producing clamping arrangements for such machinery. In this connection, both clamping systems can relate to exterior clamping or interior clamping. These clamping methods are advantageously employed in particular in those cases in which accurate workpieces are demanded, which have an inaccurate tube shape, have damaged clamping faces, or are deformed by hardening processes or the like. It is also possible to clamp exactly pre-processed workpieces, in that case the advantage lies in the dependability of the process, for example if dirt enters between the clamping faces, or the clamping faces are damaged when previously transported.

The invention claimed is:

1. A clamping arrangement (1', 1") for clamping a workpiece to be processed along a processing shaft (6) in a processing machine including the processing shaft (6), the clamping arrangement comprising:
   a clamping head (3', 3") rotatable around the processing shaft (6), the clamping head including a clamping tip (9) insertable at least in part frontally into a tube-shaped workpiece and that is one of substantially cone-shaped or truncated cone-shaped, with an axis of symmetry that coincides with the processing shaft (6), the clamping tip including a plurality of cutouts (10) in and spaced about the clamping tip; and
   a plurality of clamping elements (5', 5") each floatingly arranged in one of the cutouts, wherein each of the clamping elements (5', 5") is pivotably arranged around a pivot shaft (8', 8") which extends parallel relative to the processing shaft (6).

2. The clamping arrangement in accordance with claim 1, wherein in an unclamped state and until shortly prior to a clamped state, the clamping elements (5', 5") able to perform pivot movements.

3. The clamping arrangement in accordance with claim 2, wherein the clamping elements (5', 5") are arranged evenly distributed over a circumference of the workpiece to be clamped in the processing machine.

4. The clamping arrangement in accordance with claim 3, wherein the clamping elements (5', 5") respectively have two clamping faces (7', 7").

5. The clamping arrangement in accordance with claim 4, wherein the clamping faces (7', 7") are evenly distributed over the circumference of the workpiece to be clamped in the processing machine.

6. The clamping arrangement in accordance with claim 5, wherein three clamping elements (5', 5") are evenly distributed over the circumference of the workpiece to be clamped into the processing machine, which together have six or twelve clamping faces (7', 7") distributed evenly over the circumference of the workpiece.

7. The clamping arrangement in accordance with claim 6, wherein, for clamping the workpiece, the clamping elements (5") are arranged, displaceable in a radial direction, on the clamping head (3").

8. The clamping arrangement in accordance with claim 7, wherein the clamping head (3') is comprised of a substantially cylinder-shaped clamping chuck body (2), with an axis of symmetry that coincides with the processing shaft (6), wherein the clamping elements (5') include clamping jaws (4) substantially arranged radially displaceable relative to the processing shaft (6).

9. The clamping arrangement in accordance with claim 8, wherein the clamping head, arranged rotatable around the processing shaft, can be driven.

10. The clamping arrangement in accordance with claim 8, for a processing machine which comprises a processing shaft (6), wherein the clamping arrangement (1') comprises a clamping head (3') for clamping a workpiece between clamping jaws (4), which are displaceably arranged on a clamping chuck body (2) of the clamping head (3') substantially radially-relative to the processing shaft.

11. The clamping arrangement in accordance with claim 1, wherein the clamping elements (5', 5") are arranged evenly distributed over a circumference of the workpiece to be clamped in the processing machine.

12. The clamping arrangement in accordance with claim 1, wherein the clamping elements (5', 5") respectively have two clamping faces (7', 7").

13. The clamping arrangement in accordance with claim 12, wherein the clamping faces (7', 7") are evenly distributed over a circumference of the workpiece to be clamped in the processing machine.

14. The clamping arrangement in accordance with claim 13, wherein three clamping elements (5', 5") are evenly distributed over the circumference of the workpiece to be clamped into the processing machine, which together have six or twelve clamping faces (7', 7") distributed evenly over the circumference of the workpiece.

15. The clamping arrangement in accordance with claim 1, wherein the clamping head (3") has a clamping tip (9) insertable at least in part frontally into a tube-shaped workpiece and that is one of substantially cone-shaped and truncated cone-shaped, with an axis of symmetry that coincides with the processing shaft (6), wherein the clamping elements (5") are floatingly arranged on a shell surface (11) of the clamping tip (9).

16. The clamping arrangement in accordance with claim 1, wherein the clamping elements (5") form at least a portion of the shell surface (11) of the one of the cone-shaped or the truncated cone-shaped clamping tip (9).

17. The clamping arrangement in accordance with claim 1, wherein, for clamping the workpiece, the clamping elements (5") are arranged, displaceable in a radial direction, on the clamping head (3").

18. The clamping arrangement in accordance with claim 17, wherein the clamping head (3') is comprised of a substantially cylinder-shaped clamping chuck body (2), with an axis of symmetry that coincides with the processing shaft (6), wherein the clamping elements (5') include clamping jaws (4) substantially arranged radially displaceable relative to the processing shaft (6).

19. The clamping arrangement in accordance with claim 1, wherein the clamping head, arranged rotatable around the processing shaft, can be driven.

20. A clamping arrangement (1', 1") for clamping a workpiece to be processed along a processing shaft (6) in a processing machine including the processing shaft (6), including a clamping head (3', 3") which is rotatable around the processing shaft (6) and clamping elements (5', 5") arranged thereon, the clamping arrangement comprising:
three clamping elements (5', 5") floatingly arranged on the clamping head (3', 3"), the clamping elements (5', 5") each pivotably arranged around a pivot shaft (8', 8") which extends parallel relative to the processing shaft (6), wherein the clamping elements (5', 5") are arranged evenly distributed over a circumference of the workpiece to be clamped in the processing machine and in an unclamped state and until shortly prior to a clamped state, the clamping elements (5', 5") able to perform pivot movements;
each of the clamping elements (5', 5") including two clamping faces (7', 7"), the three clamping elements together including six clamping faces (7', 7") distributed evenly over the circumference of the workpiece to be clamped in the processing machine;
wherein the clamping head (3") has a clamping tip (9) insertable at least in part frontally into a tube-shaped workpiece and that is one of substantially cone-shaped or truncated cone-shaped, with an axis of symmetry that coincides with the processing shaft (6), wherein the clamping elements (5") are floatingly arranged on a shell surface (11) of the clamping tip (9).

21. The clamping arrangement in accordance with claim 20, wherein the clamping elements (5") are floatingly arranged in cutouts (10) in the shell surface (11) of the clamping tip (9).

22. The clamping arrangement in accordance with claim 20, wherein the clamping elements (5', 5") are each pivotably arranged around a pivot shaft (8', 8") which extends parallel relative to the processing shaft (6).

23. The clamping arrangement in accordance with claim 20, for a processing machine which comprises a processing shaft (6), wherein the clamping arrangement (1") comprises two clamping tips (9) oppositely arranged on the processing shaft (6) for clamping the tube-shaped workpiece between the two clamping tips (9).

24. A clamping arrangement (1', 1") for clamping a workpiece to be processed along a processing shaft (6) in a processing machine including the processing shaft (6), including a clamping head (3', 3") which is rotatable around the processing shaft (6), and clamping elements (5', 5") arranged thereon, the clamping arrangement comprising:
three clamping elements (5', 5") floatingly arranged on the clamping head (3', 3"), the clamping elements (5', 5") each pivotably arranged around a pivot shaft (8', 8") which extends parallel relative to the processing shaft (6), wherein the clamping elements (5', 5") are arranged evenly distributed over a circumference of the workpiece to be clamped in the processing machine and in an unclamped state and until shortly prior to a clamped state, the clamping elements (5', 5") able to perform pivot movements;
each of the clamping elements (5', 5") including two clamping faces (7', 7"), the three clamping elements together including six clamping faces (7', 7") distributed evenly over the circumference of the workpiece to be clamped in the processing machine; and
the clamping head (3") has a clamping tip (9) at least in part frontally into a tube-shaped workpiece and that is one of substantially cone-shaped or truncated cone-shaped, with an axis of symmetry that coincides with the processing shaft (6), wherein the clamping elements (5") form at least a portion of the shell surface (11) of the one of the cone-shaped or the truncated cone-shaped clamping tip (9).

25. The clamping arrangement in accordance with claim 24, wherein the clamping elements (5") are floatingly arranged in cutouts (10) in the shell surface (11) of the clamping tip (9).

26. The clamping arrangement in accordance with claim 24, for a processing machine which comprises a processing shaft (6), wherein the clamping arrangement (1") comprises two clamping tips (9) oppositely arranged on the processing shaft (6) for clamping the tube-shaped workpiece between the two clamping tips (9).

* * * * *